W. M. CUMMER.
SIGNAL FOR AUTOMOBILES.
APPLICATION FILED JUNE 21, 1910.
1,136,895.
Patented Apr. 20, 1915.
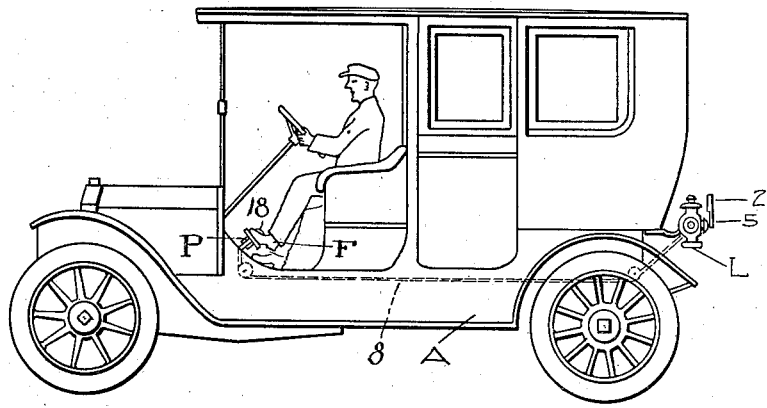
FIG. 1.
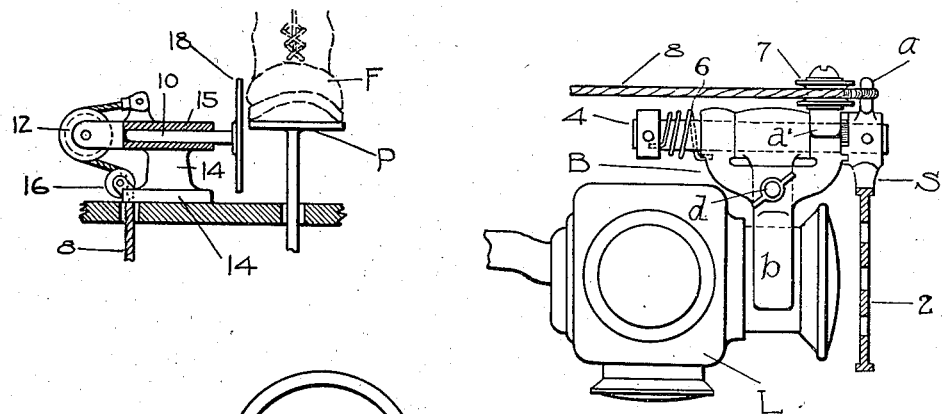
FIG. 2.
FIG. 3.
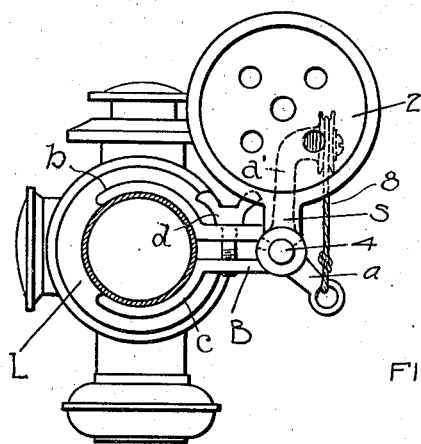
FIG. 4.
ATTEST:
E. M. Fisher
J. C. Mussun
INVENTOR
William M. Cummer,
BY Fisher & Mosen
ATTY'S

UNITED STATES PATENT OFFICE.

WILLIAM M. CUMMER, OF CLEVELAND, OHIO.

SIGNAL FOR AUTOMOBILES.

1,136,895.   Specification of Letters Patent.   Patented Apr. 20, 1915.

Application filed June 21, 1910. Serial No. 568,230.

*To all whom it may concern:*

Be it known that I, WILLIAM M. CUMMER, citizen of the United States, residing at Cleveland, in the county of Cuyahoga and State of Ohio, have invented certain new and useful Improvements in Signals for Automobiles, of which the following is a specification.

My invention relates to a signal for automobiles, and the invention consists in a signal adapted to be used day or night with or without a light to indicate to a vehicle that follows when one proposes to turn to right or left from the direction he is traveling or to stop without turning.

My invention provides for doing all this from the operator's seat without looking back or making other change of position, and the present example of the invention is shown as being initially related to one of the pedals, so that the foot which operates either clutch or brake can also operate this device and at the same time or independently. I might of course provide for actuation by hand instead of foot and make any practical connections thence to the signal, but the means shown serve to illustrate one of the practical forms of the invention.

Referring to the drawings, Figure 1 is a side elevation of a power propelled automobile equipped with my invention. Fig. 2 is a sectional elevation of the initial or foot operating parts of the complete signaling mechanism, and Fig. 3 is a side elevation of the signaling parts adapted to be operated from said foot controlled parts. Fig. 4 is a rear elevation of a lamp or light and a signaling arm raised at the side thereof and adapted to be lowered in front of said light at night for signaling purposes and as hereinafter fully described.

These drawings show an automobile A, a light or lamp L which in this instance is the red light required by law, and a signaling member S having an opaque disk 2 provided with perforations or slots or the like and adapted to be lowered in front of said light at night and by changing its appearance attract the attention of the party following. The said perforations show spots of light and thus change the appearance of the red light so much that the difference is at once noticed by the person behind, but any equivalent of the said perforations can be used. The said arm S is fixed on a rock shaft 4 and adapted to rest in front of said light L only when signaling occurs and as a signal. When this has been done the said shaft is rotated and the said arm with its disk or opaque body 2 is turned up relatively as seen in Fig. 4 and the light or lamp shows as usual. But when the signaling arm is brought over said light the fact that its appearance is changed attracts the attention of the party approaching and becomes a cautionary signal to him and he is thus advised that there is to be either a turn or a stop by the machine giving the signal. Said shaft 4 is shown in this instance as mounted in a bracket B provided with a clamping jaw *b*, and another clamping jaw *c* is sleeved on said shaft between the ears of said bracket on said shaft and a screw *d* serves to bind said jaws together upon a neck of the lamp. It might be either neck or some other portion of the lamp body or other supporting means, and whatever the means the essential function thereof is to hold the signaling arm in right working relations in respect to the light or lamp L. The said arm S is fixed on the outer end of said shaft 4 which extends somewhat beyond said bracket B at its other end and carries a spiral spring 6 which is so arranged and related that it exerts a constant light or upward rotation in respect to said arm S to hold it normally up, as in Fig. 4. It therefore requires power to move said arm back or down with disk 2 in front of the light L, and this is provided in and through the cord 8 which is fastened at one end to a projection or arm *a* from said main arm S and runs over a sheave supported on a fixed arm *a'* from clamping bracket B. Thence said cord passes to the front of the machine, Fig. 2, to the actuating mechanism, seen in Fig. 2 and through which and said cord the said shaft 4 is rotated within fixed limits to lower arm L in front of said light. Otherwise said cord 8 runs over sheave 12 on what may be termed a plunger shaft 10 which is mounted in a fixed bracket 14 on the front of the machine and is provided with a sleeve 15 in which said shaft is adapted to slide axially within limits. To these ends also the said cord 8 is fixed to a lug on bracket 14 over and behind sheave 12 and runs over another sheave 16 below and behind said sheave, and said plunger shaft 10 has a disk 18 or its equivalent on its inner end adapted to be pressed against by the foot F of the driver on the pedal P. A comparatively slight side movement of the foot on the said pedal will give shaft 10 all the thrust it requires, and the arrangement of the associate mechanism compounds the movements to signal arm or member S so as to promptly move the same in respect to lamp L. The said arm S is designed to operate as both a day and a night signal, and coöperates with the light by night but in the day time the said arm alone becomes the signaling member. Normally it stands upright in plain view, but when it is turned down from this position it gives the desired day signal to the party following. An arm with a disk as shown or any equivalent thereof can be used. When the operator removes his foot from the actuating part 18 he relieves pressure from shaft 10 and spring 6 on shaft 4 promptly raises the said arm to normal. This operation in no wise interferes with the driver's control of the clutch or brake or any other part of the machine. I need not necessarily use a red light with said arm and there might be a special light provided for this purpose. So also foot or hand operation may be employed and any suitable intervening mechanism.

What I claim is:

A signaling mechanism for automobiles comprising a lamp at the rear of the machine, in combination with a rotatable shaft at one side of said lamp, a bracket clamped on said lamp and supporting said shaft, a disk mounted on one end of said shaft and having an arm to operate the same, said disk adapted to be rotated in front of said lamp, a spring on the opposite end of said shaft from said disk arranged to hold said disk in raised position apart from said lamp, a cable extending from the said arm on said disk to the front of the machine and means adapted to be engaged by the foot of the driver to operate said cable and throw said disk in front of said lamp, the said disk having a plurality of holes through the same.

In testimony whereof I affix my signature in presence of two witnesses.

WILLIAM M. CUMMER.

Witnesses:
F. C. MUSSEM,
H. T. FISHER.